United States Patent [19]

Tilton et al.

[11] Patent Number: 4,473,231

[45] Date of Patent: Sep. 25, 1984

[54] DYNAMIC SEAL FOR SUBTERRANEAN WELL

[75] Inventors: Frederick T. Tilton, Spring; Roger A. Weinberg; Morgan C. Salter, III, both of Houston, all of Tex.

[73] Assignee: Baker Oil Tools, Inc., Orange, Calif.

[21] Appl. No.: 502,465

[22] Filed: Jun. 9, 1983

[51] Int. Cl.³ .............................................. F16J 15/18
[52] U.S. Cl. ........................................ 277/124; 277/9; 277/30
[58] Field of Search .................... 277/9, 9.5, 11, 30, 277/31, 123–125

[56] References Cited

U.S. PATENT DOCUMENTS

| | | | |
|---|---|---|---|
| 2,284,340 | 5/1942 | Nuckles | 277/124 X |
| 2,665,151 | 1/1954 | Fisler et al. | 277/124 |
| 3,467,394 | 9/1969 | Bryant | 277/124 X |
| 4,234,197 | 11/1980 | Amancharla et al. | 277/125 X |
| 4,283,062 | 8/1981 | Catanzaro et al. | 277/124 X |
| 4,290,484 | 9/1981 | Beall et al. | 277/9 X |

*Primary Examiner*—Robert S. Ward
*Attorney, Agent, or Firm*—Norvell & Associates

[57] ABSTRACT

An assembly for use in establishing sealing integrity between an inner and outer conduit in a subterranean well is disclosed. A multi-component seal assembly having a plurality of individual seal units is assembled on the exterior of an inner tubular conduit for insertion into the bore of an inplace tubular seal receptacle located in a subterranean well. The tubular conduit and associated seal assembly can be inserted into the bore and axial reciprocation of the tubular conduit relative to the seal receptacle is possible without damage to vee-shaped primary elastomeric sealing elements during insertion, while sealing integrity is maintained within the seal receptacle and during unloading and removal of the seals from the seal receptacle.

5 Claims, 2 Drawing Figures

DYNAMIC SEAL FOR SUBTERRANEAN WELL

BACKGROUND OF THE INVENTION

1. Field of the Invention

This relates to multi-component seal systems for use in the completion and production operations of oil and gas wells wherein the seal assemblies comprise multiple units, each having sub-components comprising sealing elements and backup elements.

2. Description of the Prior Art

Movement of tubing within the sealing bore of in-place seal receptacles in subterranean wells, such as bores of packers, bridge plugs and the like, during completion and production operations in high pressure, high temperature oil and gas wells has been a major cause of damage to seal systems and subsequent diminished performance and sealing integrity of such seal systems. Damage to the seal systems has become a greater problem as a result of the search for new oil and gas reserves wherein the drilling and subsequent completion is in deeper wells involving exposure to extremely hostile high temperature, high pressure environments wherein the well production may contain a significant amount of hydrogen sulfide, carbon dioxide and methane.

Generally, the seal systems in prior art have not been totally suitable for use in wells having high bottomhole temperature and pressures and corrosive fluids have also been found to be defecient when exposed to even less severe environments. Various new elastomeric materials have been used in these sealing systems. A report of the 52nd Annual Fall Technical Conference and Exhibition of the Society of Petroleum Engineers, Oct. 9-12, 1977, discusses the teaching of a number of the various new elastomeric type materials in relation to their use in packer seal systems. This report, number SPE 6762, discloses the se of three particular polymeric-type materials which can be utilized in packer seal systems. These polymeric materials are commonly sold under trademarks of Teflon, a polymer of tetrafluoroethylene; Ryton, a polymer of polyphenolenesulphide; and Kalrez, a perfluoroelastomer. Another seal system utilizing these polymers to form a seal unit in turn incorporated into a multi-component seal stack is disclosed in U.S. Pat. No. 4,234,197.

The materials used in these seal systems are relatively expensive and despite the improved performance generally offered by such seal systems, unexplained damage has often resulted to the seal elements employed in these seal stacks. Extremely high sticking forces have also been exhibited by the seal assemblies using these three polymeric materials in multi-unit stacks. When seal stacks have been removed from the well, it has been found that individual elements have been totally destroyed and, in some cases, the order of the adjacent elements comprising the seal stack has been rearranged in actual use. Considerable damage has also resulted to the outer sealing surface of the primary sealing elements. Due to the inaccessibilty of the seals during actual operation, the mechanics of such seal damage has been unclear.

SUMMARY OF THE INVENTION

An assembly for use in establishing dynamic sealing integrity between a tubular conduit, such as a tubing string, and an in-place tubular seal receptacle, such as a packer, bridge plug or expansion joint, includes a multi-unit, multi-element seal assembly. The seal assembly comprises a plurality of seal units with seal units oriented in opposite directions to hold pressure from both ends of the seal stack. The various elements and units of the seal stack are assembled on the exterior of the tubular conduit prior to insertion of the seal stack into the well. Each separate seal unit comprises at least a primary sealing element, which in the preferred embodiment of this invention has a vee-shaped cross-section with opposed concave and convex ends and at least one adjacent backup member having a convex surface adjacent the concave surface of the primary elastomeric sealing element. The backup member comprises means for closing off the annular extrusion gap along the bore of the outer seal receptacle. The vee-shaped sealing element has a coefficient of expansion greater than the coefficient of expansion of the backup member. The backup member, however, does expand to close off or reduce the extrusion gap along the seal receptacle bore and therefore prevents loss of primary sealing material through the annular sealing gap. The angle defined by inner and outer surfaces on the convex end of the backup member is acute and is normally less than the angle defined by inner and outer surfaces on the concave end of the primary sealing member. Thus when the individual seal units are assembled, the inner and outer surfaces on the concave end of the primary sealing member are not in contact with the inner and outer surfaces on the concave end of the adjacent annular backup member. The primary sealing element is therefore free to flex radially and to expand inwardly and outwardly along the concave end of the vee-shaped member.

The seal stack is assembled on the exterior of the inner tubular member and is located between upper and lower shoulders for retaining the seal stack within the cavity defined by these spaced apart shoulders. The overall length of the seal stack is, however, normally less than the overall length of the cavity defined by the opposed shoulders. Radial deformation of the primary sealing elements comprising the multi-element seal stack is therefore permissible and axial deformation of all of the seal elements is normally permissible when the seal assembly is positioned on the inner tubular conduit prior to insertion of the conduit into the in-place seal receptacle at a subsurface location within the well.

DESCRIPTION OF THE PREFERRED EMBODIMENT

The seal assembly of the present invention comprises six seal units in a sequential layer arrangement wherein each seal assembly is separated by hard rigid members comprising plastic or metal. The outer (or upper and lower) two seal elements comprise a thermoplastic resin material which has a greter coefficient of expansion than the rigid member which it abuts and of the associated conduit for sealing in the well bore. In addition, the resin material has a high resistance to corrosion chemicals, high temperatures and has a property of machineability to very close tolerances. The resin material has a physical strength sufficient to prevent its extrusion into the gap between the rigid spacing member and the well conduit. Preferably the resin is a polymer of polyphenolene sulfide presently commercially available under the trademark Ryton from Phillips Petroleum Company, and is disclosed in U.S. Pat. No. 3,324,074, the disclosure of which is incorporated herein by reference.

Within a given seal unit, the inner two members are disposed between the outer polyphenolene sulfide backup members. One of the internal elements comprises a polytetrafluoroethylene polymer and the second unit comprises an elastomer comprising a reaction product of tetrafluoroethylene and perfluoro ethers. First of the two inner seal elements is the polymeric reaction product of tetrafluoroethylene which is a flexible material having a high degree of permanent set and cold flow, resistance to high temperatures, corrosion chemicals, etc. This product is available commercially as Teflon, a registered trademark of Dupont and Company. The other of the two inner seal elements is made from an elastomer comprising the co-polymerization reaction product of tetrafluoroethylene and perfluoro ethers. Ethers can be perfluoro (methylvinyl ether) and a perfluorovinyl ether. The material, when cross-linked, is vulcanized with outstanding chemical and fluid resistance in high temperature oxidative resistance. These elastomers are typified by the disclosure in U.S. Pat. No. 3,682,872, incorporated herein by reference. A typical elastomer made in accords with the teaching of this patent is commercially available under the trademark Kalrez from Dupont and Company.

Figure 1:
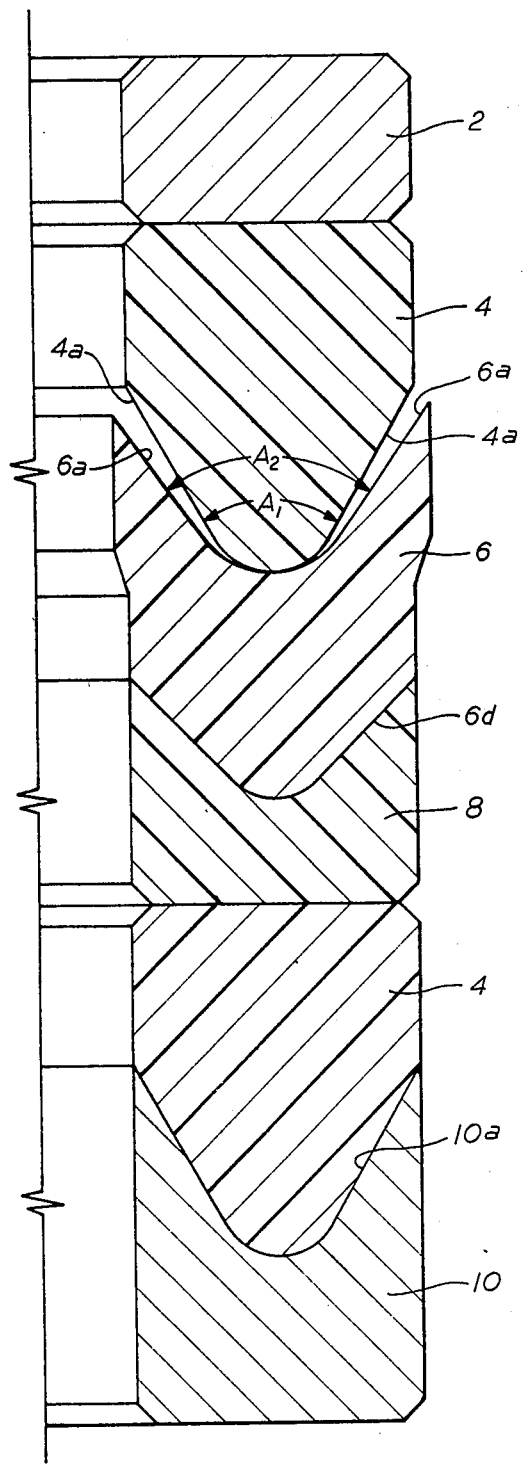
FIG. 1 is a cross-sectional view showing one multi-element seal unit.

Referring now to FIG. 1, the elements comprising a single seal unit are shown. The cross-sectional configuration of each of the elements in a single seal unit are shown in FIG. 1. Element 2 comprises an annular rigid ring which, in the preferred embodiment of this invention, comprises a suitable comparatively soft metal spacer member. It should be understood, of course, that the spacer member 2 can be formed of a material other than a metal. At the lower end of FIG. 2, a separate rigid spacer member 10 is disposed. Lower spacer member 10 is, in the preferred embodiment, a metallic member having a composition similar to upper spacer member 2. The upper surface of lower spacer member 10 has a concave surface suitable for mating with a polymeric backup member element 4.

Two polymeric backup members 4 are disposed on either side of the primary sealing elements in a single seal unit. Each backup member 4 has a coefficient expansion greater than the outer spacer members 2 and 10. Each annular backup member is adapted to seal off any annular extrusion gap between backup member 4 and either the inner tubular conduit or the bore of the outer seal receptacle. In the preferred embodiment of this invention, the annular backup members in a single seal unit are identical and are oriented in the same direction. Each polymeric backup member has a concave end having identical inner and outer surfaces 4a defining an included angle $A_1$.

A primary sealing element 6 is positioned adjacent the convex end of one of the annular backup members 4. The primary sealing element 6 has enlarged sealing flanges 6b located adjacent an upper concave surface defined by oppositely facing identical surfaces 6a. Surfaces 6a defining the concave upper surface of primary sealing element 6 define an included acute angle $A_2$ which, in the preferred embodiment of this invention, is larger than the included angle $A_1$ defined by the convex surfaces on sealing element 4. As seen in FIG. 1, the seal element, when assembled on the tubular conduit, is in contact with the annular backup member only adjacent the apex of the convex surface of backup member 4. The surfaces 6a and 4a on the primary sealing element and backup member 4, respectively, diverge as shown in FIG. 1. The enlarged sealing flange element 6b on seal 6 are therefore free to deform radially relative to the annular backup member 4.

Figure 2:
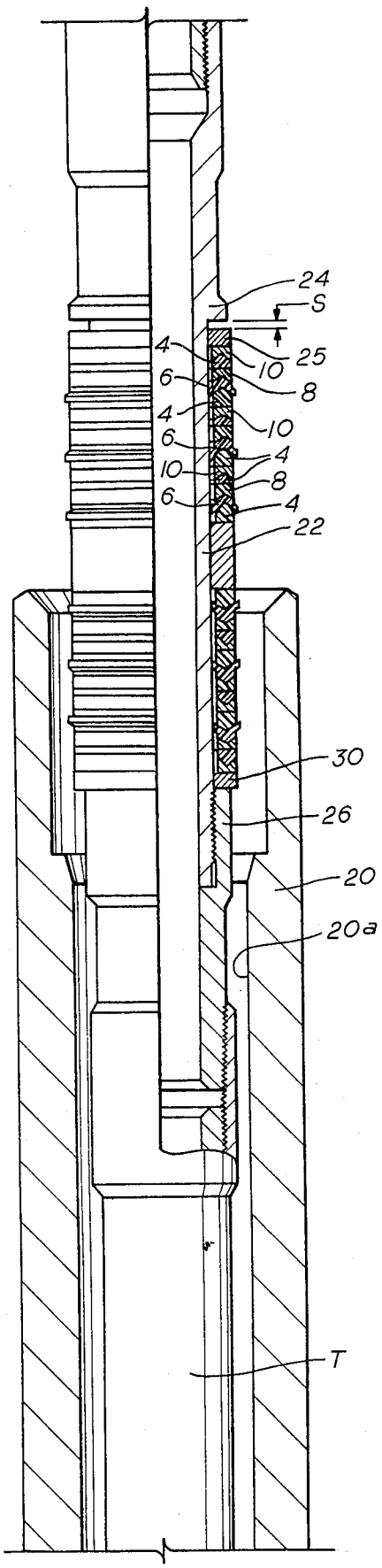
FIG. 2 is a view of the inner tubular conduit and seal assembly immediately prior to insertion of the seal assembly into the bore of an in-place seal receptacle, such as a packer.

The seal assembly comprising the plurality of seal units, such as that shown in FIG. 1, are assembled on the inner tubular conduit 22 between upper and lower retaining shoulders 24 and 26 which define an annular recess or cavity along the exterior of the tubular conduit 24. FIG. 2 shows the tubular conduit and associated steal stack just prior to insertion of the seal stack into the bore 20a on the tubing seal receptacle. Retainer rings 28 and 30 are shown at opposite ends of the seal stack. These rings can be metallic members having a composition similar to that of the spacer members 2 and 10 in the seal stack. As shown in FIG, 2 the length of the seal assembly, including metal spacer members and metal spacer rings 28 and 30, is shown to be less than the total length of the cavity defined between shoulders 24 and 26. Longitudinal deformation and longitudinal movement of all of the members of the seal stack is therefore possible. The overall difference in length between the seal stack and the seal stack receiving recess is illustrated by the distance S, which is exaggerated for the purpose of clarity.

Although the divergance between angles $A_2$ and $A_1$ is not apparent in FIG. 2, it should be understood that the concave surfaces of the primary sealing element 6 are not necessarily in contact with the convex surfaces 4a on annular sealing element 4 when the separate sealing elements and seal units are assembled in the configuration shown in FIG. 2. It should be understood, however, that both radial deformation of the primary sealing element and longitudinal deformation of the seal stack elements can occur prior to insertion of the seal stack into the bore of the seal receptacle 20. For instance, the temperature at the subsurface location illustrated in FIG. 2 may be substantially in excess of the temperature at the surface of the well. Seal stack employed in this configuration therefore differs substantially from vee-shaped seal stacks normally used between reciprocating conduits in which the seal stack is captured between the assembled tubular members. It has been found that the size and shape of the various elements comprising a single seal stack can occur because of temperature effects, and because of absorption of fluids in the well by the various seal elements. This tendency to expand can make insertion of the seal stack into the seal bore 20a difficult because a close fit must be maintained if sealing integrity is to be maintained. It has been found that size changes for individual elements will not appropriately account for the insertion or stab-in problems encountered with seal stacks of this type used on subterranean oil and gas wells. Insertion of the seal stack into the seal bore is, however, possible by changing the relationship between the concave and convex surfaces on the annular backup member and the primary sealing element and by providing room for longitudinal expansion of all of the various elements in the seal stack. Acceptable insertion or stab-in performance without damaging the seal can be maintained while not effecting the sealing integrity maintained by the primary sealing element with the seal bore 20a and with the inner tubular conduit 22. The use of multiple seal units and seal elements in a single seal stack further complicates the problems of insertion or stab-in for a seal receptacle of the type depicted herein. When a pressure differential is created across the first seal entering a seal bore, a compressive force is applied to the first multi-component seal unit. This pressure force is in turn transmitted to each of the remaining seal elements prior to the insertion in the seal bore. This pressure force acts on the elastomeric primary sealing element and causes the sealing element to expand thus increasing the likelihood that subsequent seal elements will be damaged upon subsequent insertion into the seal bore. In the event that an additional pressure differential exists across subsequently inserted seals, the pressure force created by all of the seals in the seal bore will be transmitted through all of the remaining sealing elements thus tending to cause progressively greater expansion of seal elements prior to insertion within the seal bore. Therefore, damage to elastomeric sealing elements will be progressively greater for subsequently inserted seal elements. It has been found that acceptable insertion or stab-in is possible by permitting longitudinal deformation of each of the elements in the entire seal assembly and by permitting radial deformation of the concave surface of the primary sealing element. In the preferred embodiment of this invention, the divergance of concave surfaces 6a from convex surfaces 4a has been found sufficient to permit radial deformation of the sealing element due to such effects as differential expansion between the elastomeric sealing element 6 and the polymeric sealing element 4 as the well temperature increase when the inner tubular conduit and seal stack are run into the well and before insertion into the seal bore 28.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An assembly for use in establishing dynamic sealing integrity between a tubular conduit and an in-place tubular seal receptacle in a subterranean well, when the tubular conduit is inserted into the in-place tubular seal receptacle in the subterranean well, the assembly comprising a seal stack energized by a pressure differential on opposite ends of the seal stack, the seal stack being assemblable in surrounding relationship to the tubular conduit before insertion of the tubular conduit into the bore of the in-place tubular seal receptacle, the seal stack further comprising a plurality of annular sealing units, each sealing unit comprising a plurality of seal elements including at least one primary sealing element adjacent a backup element, the primary sealing element having a concave transverse end having first and second adjoining surfaces thereon defining a first normally acute included angle therebetween, the backup element having a convex end having third and fourth adjoining surfaces defining a second normally acute included angle therebetween, the second acute angle being normally less than the first acute angle, whereby the first and second surfaces on the primary sealing element normally diverge with respect to the adjacent third and fourth surfaces on the adjacent backup member; the assembly further comprising spaced apart retaining means on the tubular conduit on opposite ends of the seal stack for retaining the seal stack in surrounding assembled relationship thereto during insertion of the tubular conduit and seal stack into the bore of the in-place tubular seal receptacle, the length of the seal stack being normally less than the separation of the retaining means prior to insertion of the tubular conduit into the subterranean well and into the in-place seal receptacle, whereby the seal stack may be inserted into the bore of the in-place seal receptacle in the presence of a pressure differential thereacross to maintain dynamic sealing integrity during reciprocation of the tubular conduit relative to the in-place seal receptacle.

2. The assembly of claim 1 wherein the primary sealing element comprises an elastomeric element.

3. The assembly of claim 2 wherein the coefficient of thermal expansion of the primary sealing element is greater than the coefficient of thermal expansion of the backup element.

4. The assembly of claim 3 wherein the primary sealing element comprises an element having a chevron-shaped cross-section.

5. An assembly for use in establishing dynamic sealing integrity between a tubular conduit and an in-place tubular seal receptacle in a subterranean well, when the tubular conduit is inserted into the in-place tubular seal receptacle in the subterranean well, the assembly comprising a seal stack energized by a pressure differential on opposite ends of the seal stack, the seal stack being assemblable in surrounding relationship to the tubular conduit before insertion of the tubular conduit into the bore of the in-place tubular seal receptacle, the seal stack further comprising a plurality of sealing units, each unit comprising at least one annular primary elastomeric sealing element and at least one adjacent annular polymeric backup element, the elastomeric sealing element having a coefficient of expansion greater than the coefficient of expansion of the polymeric backup element, the backup element being spaced from the sealing element along a portion of the adjacent surface to allow radial deformation of the primary sealing element relative to the backup element; the assembly further comprising spaced apart retaining means on the tubular conduit on opposite ends of the seal stack for retaining the seal stack in surrounding assembled relationship thereto during insertion of the tubular conduit and seal stack into the bore of the in-place tubular seal receptacle, the length of the seal stack being normally less than the separation of the retaining means prior to insertion of the tubular conduit into the subterranean well and into the in-place seal receptacle, whereby the seal stack may be inserted into the bore of the in-place seal receptacle in the presence of a pressure differential thereacross to maintain dynamic sealing integrity during reciprocation of the tubular conduit relative to the in-place seal receptacle.

* * * * *